(12) United States Patent
Gerhardt et al.

(10) Patent No.: US 7,207,213 B2
(45) Date of Patent: Apr. 24, 2007

(54) DEVICE FOR STABILIZING THE ENGINE INLET FLOW IN STATIC TESTS OF ENGINES

(75) Inventors: Hans-Joachim Gerhardt, Aachen (DE); Horst Meessen, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/568,361

(22) PCT Filed: Aug. 11, 2004

(86) PCT No.: PCT/DE2004/001807

§ 371 (c)(1),
(2), (4) Date: May 17, 2006

(87) PCT Pub. No.: WO2005/016754

PCT Pub. Date: Feb. 24, 2005

(65) Prior Publication Data

US 2006/0280556 A1    Dec. 14, 2006

(30) Foreign Application Priority Data

Aug. 13, 2003 (DE) .............................. 103 37 372

(51) Int. Cl.
*G01M 15/00* (2006.01)
(52) U.S. Cl. ........................................... 73/116
(58) Field of Classification Search ................ 73/116, 73/117.2, 117.3, 118.1, 118.2, 117.4, 117.1
See application file for complete search history.

(56) References Cited

U.S. PATENT DOCUMENTS

| | | | |
|---|---|---|---|
| 3,604,530 A * | 9/1971 | Duthion et al. ............. 181/210 |
| 3,698,509 A | 10/1972 | Fitting et al. |
| 4,258,823 A | 3/1981 | Ganz et al. |
| 4,958,700 A * | 9/1990 | Schafhaupt .................. 181/218 |
| 5,377,534 A | 1/1995 | Boet |
| 5,396,793 A * | 3/1995 | Colletti ...................... 73/117.4 |
| 5,591,904 A | 1/1997 | Schafhaupt et al. |
| 5,837,890 A * | 11/1998 | Long ........................... 73/116 |
| 6,162,011 A | 12/2000 | Gerhardt |
| 6,598,384 B1 | 7/2003 | Adkins |
| 2001/0029773 A1 * | 10/2001 | Helgeson .................... 73/23.31 |
| 2003/0217593 A1 * | 11/2003 | Clark et al. ................... 73/116 |

FOREIGN PATENT DOCUMENTS

DE    197 43 591    5/1999
EP    0 649 788    4/1995

\* cited by examiner

*Primary Examiner*—Eric S. McCall
(74) *Attorney, Agent, or Firm*—W. F. Fasse; W. G. Fasse

(57) ABSTRACT

The invention relates to an apparatus for the stabilization of the engine inlet flow in engine static tests. It consists of an arrangement with an air-permeable element (4), which is arranged in an end position situated close to an engine housing (2) and partially enclosing the latter. The air-permeable element is formed with a first air-permeable embodied planar element part (6), that is arranged below the engine housing, which is positioned along a horizontal engine housing axis and parallel to a planar ground (7) in the vertical spacing distance (a), on the surfacial rim side on the longitudinal edges of which, the longitudinal edges being situated along the engine housing axis, there are arranged, laterally downstream of the longitudinal edges, further air-permeable embodied planar element parts (9–12), that are embodied foldable out of a horizontal orientation to the engine housing.

18 Claims, 1 Drawing Sheet

DEVICE FOR STABILIZING THE ENGINE INLET FLOW IN STATIC TESTS OF ENGINES

Figure 1:
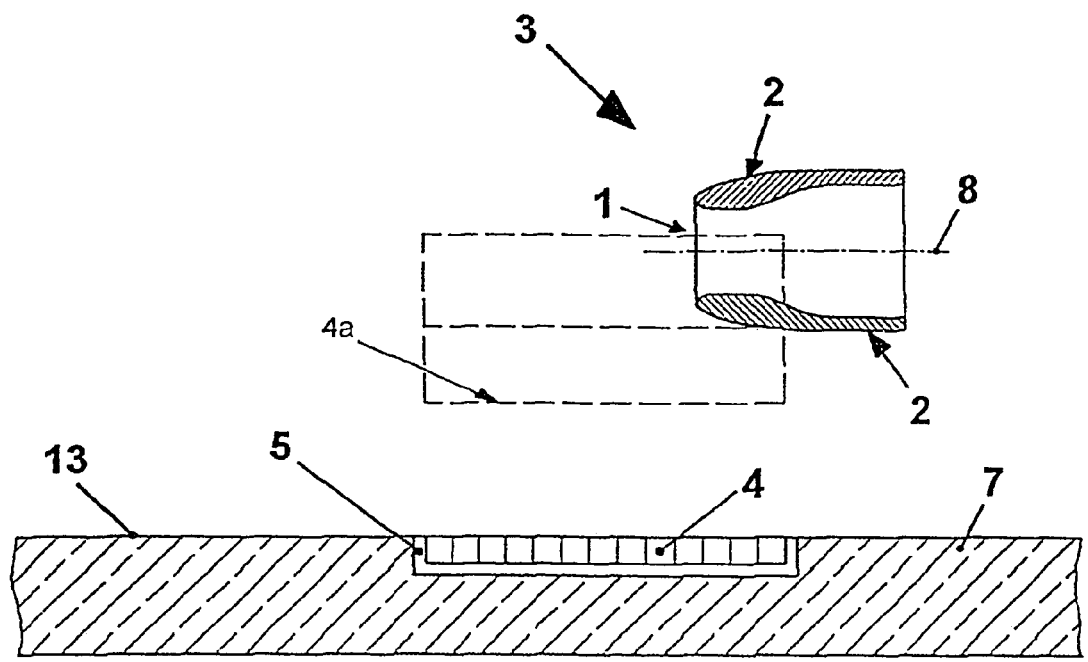

The invention relates to an apparatus for the stabilization of the engine inlet flow in engine static tests according to the preamble of the claim 1. This apparatus is used in connection with engine static tests for the stabilization of the inlet flow of an engine that flows in at the engine inlet or intake. With it, the effort or expense for the preparation of an engine static test, which will arise for the arrangement and installation or assembly of a surfacial or planar component in front of the engine and including its appropriate adjustment, is reduced to a justifiable measure. Shunting or shuttling problems, which often cause a considerable effort in connection with an intended engine static test due to changing the resting location of the required apparatus from the place it was set down to below the standing plane of the aircraft, whereby additionally still the lifting and adjustment effort of the surfacial or planar component is to be considered, will be things of the past, which could cause a considerable effort particularly in the use of known apparatuses for the stabilization of the engine inlet flow in engine static tests on high capacity passenger and transport aircraft.

Such an apparatus for the stabilization of the engine inlet flow in engine static tests was already made known to the technical world with the DE 197 43 591 C2. From the FIGS. 2 to 4 thereof with the correlating figure descriptions, the person of skill in this art will recognize an apparatus for the stabilization of the engine inlet flow in engine static tests, which similarly comprises an (apparatus with an) air-permeable element, that is arranged before or in front of the engine inlet and that extends along over the engine inlet. This element, which is embodied or constructed half-cylindrical and of one piece, is, during the preparation phase for the intended engine static test, positioned near the engine housing with suitable transport means and lifting tools, which are not discussed in further detail, and is there adjusted into a provided element setting or adjustment in a manner that requires very much effort, such that the air-permeable element is arranged partially enclosing or reaching around the outer perimeter of the engine housing. The technological effort that the construction of this apparatus will require is evaluated as very high, whereby further it must be considered that probably dangers can never be excluded, which can if applicable only be limited to remaining residual dangers during the transport and the lifting process of the (not exactly lightweight constructed) air-permeable element to near the applicable wing-mounted engine on the aircraft, as well as in its orientation into a desired position below the engine housing. The background of the use of such an arrangement exists because in engine static tests, the influence of the (surely) air-impermeable ground or floor or taxiway for an aircraft as well as an excessive lateral wind effect on the arrangement for the engine static test would lead to unacceptable or impermissible flow conditions, whereby it results in the creation of a spiral vortex between the ground and the engine inlet, which form an air chamber. If now a spiral vortex forms in front of the engine inlet on the mentioned air-permeable element, then, as a result of the permeability of its wall surface, air can flow after or followingly into a vortex core of the spiral vortex, whereby the pressure in the vortex core will increase, the angular momentum of the air particles is reduced, and the vortex strength is diminished.

In that regard, for example, the reduction of the vortex strength can be strengthened by the blowing-out of air through the air-permeable surface of that element. To the extent that a sufficient after-flow of air through this element is ensured, the creation of a developed or distinct spiral vortex is completely prevented.

The publication DE 197 43 591 C2 can provide additional detail informations to an interested expert or person of skill, which publication correspondingly gives information about aerodynamic relationships, which, as a background, relate to the undesired flow conditions (instabilities) during the flight operation on an engine, and to the ground effect in the engine static test as well as, in the foreground or principally, to the presented apparatus for the stabilization of the engine inlet flow in engine static tests.

The prior art closest to this invention will mainly be directed to the construction of the apparatus for the stabilization of the engine inlet flow in the engine static tests and the associated technological course or progression during the preparation of an engine static test on the wing-mounted engine of an aircraft, to which is allocated the presented apparatus with the indicated disadvantages (unavoidable transport distances, more-difficult handling, constant time delays due to re-adjustments of the air-permeable element), which shall be improved or, if applicable, avoided.

Therefore, the object underlies the invention, to improve a generic apparatus for the stabilization of the engine inlet flow in engine static tests in such a manner that the air-permeable element (as a component of an apparatus) is positioned without problems and without manual effort near a wing-mounted engine of the aircraft that has been moved or set into the static test arrangement, whereby no additional transport capacities may arise. Endangerments are to be completely avoided through technological improvements of the known lifting and adjusting technology(ies) of this element, which can be realized through an improvement of the construction of the air-permeable element. The apparatus shall be utilizable rationally and independent of the weather.

This object is achieved through the measures set forth in the claim 1. Suitable further developments and embodiments of these measures are set forth in the further claims.

Figure 2:
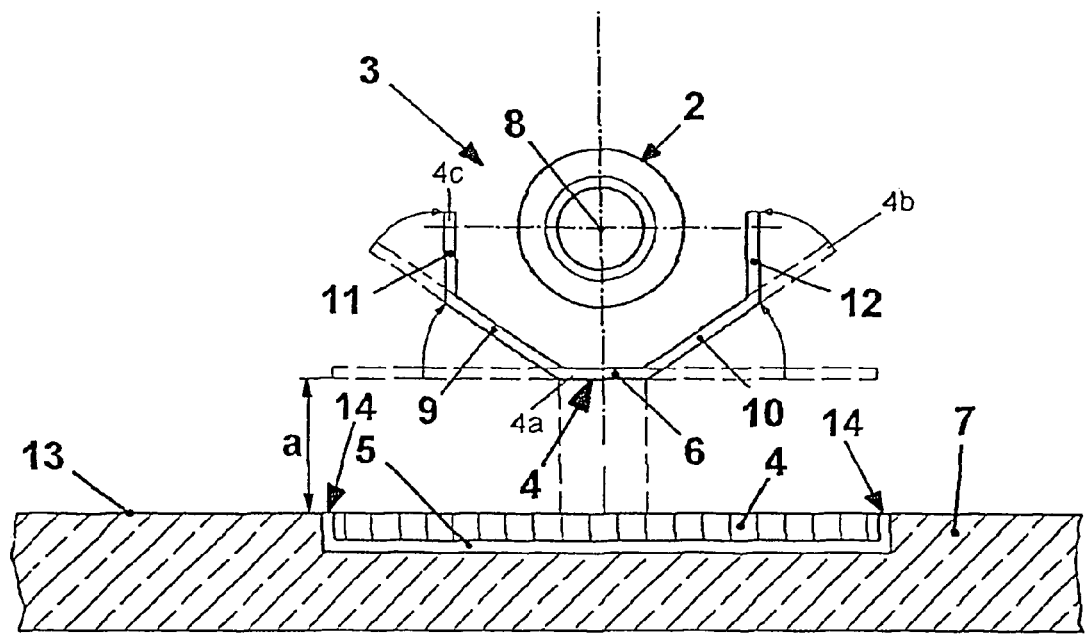

The invention is explained in further detail in an example embodiment in connection with the accompanying drawings. In this regard FIG. 1 shows the apparatus for the stabilization of the engine inlet flow in engine static tests with an air-permeable element set into the taxiway, and an engine positioned above the element (longitudinal section in the vertical engine axis);

FIG. 2 shows the air-permeable element positioned at the height of and near the engine, which element is integrated of several element parts folded or tilted to the engine housing (vertical section parallel to the inlet plane of the engine).

The apparatus consists of an arrangement, which mainly comprises, besides other components, an air-permeable element 4. The illustration of the FIGS. 1 and 2 show an air-permeable element 4, that is integrated (clearly recognizable in the FIG. 2) of several air-permeable element parts 6, 9 to 12 (element surfaces) that are tiltable or foldable (toward a to the engine housing 2). In one (of the possible) end position(s), that air-permeable element 4 is positioned situated very close to an engine housing 2, which is arranged partially enclosing or reaching around the latter.

Returning to the FIG. 1, one can see that that air-permeable element 4, which is integrated from a first element part 6 and further element parts 9 to 12, is initially laid or set down on a planar configured floor or ground 7 (in horizontal position or orientation).

A ground area is cut out of or recessed into the ground 7. On the ground rim or perimeter side, a ground boundary 5 is bordered or framed into the recess of the ground 7, which boundary is adapted or fitted to the form of the air-permeable element 4 that is integrated (out of several element parts 6, 9 to 12). Within the ground boundary 5 (for example massively constructed with angle or edge elements), the air-permeable element 4 is arranged with a planar surface, of which the non-ground-contacting surface region is arranged flush with a ground-opposite side region 14 (of the bounding angle or edge elements) of the ground boundary 5, or at nearly flush at least with the ground surface of the ground 7.

Under actual or real test conditions, the observer will find out that engine static tests will hardly ever take place on a parking surface of the selected aircraft. For reasons of noise protection, the static tests are displaced into engine static test arrangements. These generally consist of three fixed or solid walls, and are oriented so that the fixed or solid walls screen-off the sound to the built-up districts or areas. Thereby, the position of the aircraft in the arrangement is prescribed, and the aircraft cannot be oriented in the wind direction as is typical in static tests in open or free terrain.

Therefore, one can begin from the assumption that a taxiway covering 13 (concrete runway) is laid or applied on the surface of the ground 7. A covering area is cut out or recessed into this taxiway covering 13, which is arranged congruent to the (previously mentioned) recessed or cut-out ground area.

This area of the recessed or cut-out taxiway surface is fitted or adapted to the integrated form (of several element parts 6, 9 to 12) of the air-permeable element 4, whereby the air-permeable element 4 (which lies with the underside in contact on a ground element within the ground boundary 5) shall terminate or align with the non-ground-contacting upper side substantially flush with the upper surface of the taxiway covering 13. Out of the intended reasons, of course, since the thusly arranged air-permeable element 4 shall cause no damage during the rolling-over of a running surface, for example of an aircraft wheel. It is also embodied in such a manner that it is able to be rolled over and capable of being rolled over by a land vehicle or a ground-contacting air vehicle, without suffering damage. One can substantially gather all of these facts from the FIG. 1.

Not shown in the FIG. 1, but indispensable for the desired arrangement of the air-permeable element 4 according to the FIG. 2, is a lifting and tilting or folding unit positioned below the ground overlay, which unit is installed sunken into the ground.

Thus, the air-permeable element 4 (horizontally situated element parts 4, 9 to 12) horizontally arranged on the ground 7 (or set down in the ground boundary 5) can be lifted with the lifting mechanism of the lifting and folding unit vertically into an intermediate position 4a located at a vertical spacing distance a that is located below the engine housing 2 and situated close to the latter, of which the ground-contacting horizontal position is maintained unchanged.

Thereby, the conditions or requirements would be met for a lifting of the air-permeable element 4 to a height level that is located near the engine housing 2. It is intended to lift the air-permeable element 4 with a first air-permeable embodied planar element part 6 to an intermediate position 4a, which (in this end position) is arranged below or under the engine housing (2) for the initially explained reasons. In this position, the (horizontally situated) arrangement of the air-permeable element 4 (consisting of several element parts 6, 9 to 12 is positioned along a horizontal engine housing axis 8 and parallel to a planar ground 7 respectively (according to FIG. 2) a taxiway surface 13 at a vertical spacing distance (a. The construction of this air-permeable element 4 takes into consideration, that on the surfacial rim side on the longitudinal edges thereof, that are situated along the engine housing axis 8, further air-permeable embodied planar element parts 9 to 12, that are embodied or constructed to be tiltable or foldable out of a (existing) horizontal position to the engine housing 2, are further downstream arranged laterally or sideways of the longitudinal edges.

This construction further takes into consideration that a second element part 9 and a third element part 10 are respectively rotatably or pivotably supported and mechanically securely connected on the longitudinal edge side on a first longitudinal edge and on a second longitudinal edge respectively, to the (previously mentioned) first element part 6. Situated next to the second element part 9, on a third longitudinal edge of the latter, a fourth element part 11 is arranged, whereby also situated next to the third element part 10, on a fourth longitudinal edge of the latter, a fifth element part 12 is arranged. These element parts 9 to 12 are all rotatably or pivotably supported and mechanically securely connected on the longitudinal edge side.

With respect to the rotatability or pivotability and the secured connection of the element parts 9 to 12, there is a broad range or selection of suitable known connection possibilities of two adjacently situated element parts available to the person of skill in the art, which he will take into account as required for the particular purpose.

A tilting or folding mechanism is also integrated into the lifting and folding unit, with which the further element parts 9 to 12, which are embodied to be foldable and facing toward the first element part 6, can be moved out of the mentioned intermediate position 4a into an end setting or position. In that regard, depending on the desired position or orientation, the air-permeable element 4 will take-up the most varied end positions. Preferably a (second) end-position is mentioned, which will correspond to an end position of the air-permeable element 4 located close to the engine housing 2.

In detail, at least three end positions 4a, 4b, 4c, which will be set forth in the following, are achievable with the air-permeable element 4 consisting of several element parts 6, 9 to 12.

A first end position is considered as given when none of the element parts 9 to 12 is angled to the first element part 6, so that the intermediate position 4a corresponding to the horizontal arrangement of all element parts 6, 9 to 12 coincides with a first end setting or position.

A second end setting is achieved when the second and the third element part (9, 10) is angled to the first element part (6) at the edge rim side, and the second and the fourth element part (9, 11) as well as the third and the fifth element part (10, 12) are arranged lying next to one another and not angled from one another as well as aligning flush in a straight line. Insofar as these flush aligned element parts 9 to 12 are moved (pushed) with the folding mechanism of the lifting and folding unit out of the intermediate position 4a and are angled from the first element part 6 at the edge rim side to a setting or position near the engine housing 2, the second end setting 4b is reached.

Otherwise, a third end setting is reached, when the second and the third element part 9, 10 is angled to the first element part 6 on the edge rim side, and the fourth element part 11 is moreover still angled from the second element part 9, as well as the fifth element part 12 is moreover still angled from the third element part 10. Thereby, the third end setting is realized, when the fourth and fifth element part 11, 12 is arranged perpendicularly to the first element part 6, whereby the third and fourth element part 10, 11 can be moved with the tilting or folding mechanism of the lifting and folding unit out of a position corresponding to the second end setting 4a into a third end setting 4c.

A preference is granted to the latter end setting 4c, because therewith the initially mentioned spiral vortex in this constellation can be most effectively influenced, thus namely the interfering influence thereof can be prevented.

To that, the following will still be added. A vertical lifting of all element parts 6, 9 to 12 of the air-permeable element 4 is effectuated with the lifting mechanism of the lifting and folding unit. Moreover, a tilting or folding of the further element parts 9 to 12 is realized with the folding mechanism of the lifting and folding unit, which will take place throughout during the lifting process.

The first element part 6 can be embodied parallelepiped or cube shaped, of which the base and cover or top surfaces are configured square or rectangular shaped. The further element parts 9 to 12 can be embodied variously, preferably parallelepiped or cube shaped, or uniformly only square or cube shaped, of which the base or cover or top surface is configured square or rectangular shaped. The configuration of the element parts 6, 9 to 12 will remain left to the desired selection for the intended purpose.

It is intended, that the first element part 6 and the further element parts 9 to 12 are embodied uniformly long along the engine housing axis 8 of an engine 3. Moreover it could be intended that the length of the fourth and of the fifth perpendicularly arranged element part 11, 12 as seen relative to one another is embodied with differing length.

Lastly, further details will be given as to the provided material for the element parts 6, 9 to 12, whereby a material of the element parts 6, 9 to 12 is taken into consideration, which is pressure and weather resistant as well as being embodied substantially light in weight. The material could consist metals or synthetic plastic type or could be composed of both components. Thereby it would be conceivable, that a suitable synthetic plastic (thermoplastic) find corresponding consideration, which is compounded or filled with metal particles or some other substances suitable for the purpose, which are useful to the material strength. Also it would be conceivable, that the element parts 6, 9 to 12 are constructed of a metal core and a synthetic plastic surrounding the latter, of which at least the metal core is synthetic plastic coated.

Summarized, the apparatus for the stabilization of the engine inlet flow in engine static tests, consists of an arrangement which mainly comprises an air-permeable element 4 formed of several element parts 6, 9 to 12, that are embodied tiltable or foldable to an engine housing 2. Through a suitable lifting and folding mechanism of a lifting and folding unit, the air-permeable element 4, as emphasized with dashed lines in the FIG. 1, can be lifted into an intermediate position 4a which, if applicable, could correspond to a first end setting. The lifting and folding of the air-permeable element 4 is schematically illustrated in the FIG. 2. The second to fifth element parts 9 to 12 realize, in common together with a horizontal first partial element 6 (remaining in the intermediate setting 4a), various different end settings of the presented air-permeable element 4.

The invention claimed is:

1. Apparatus for the stabilization of the engine inlet flow in engine static tests, that is used for the improvement of the engine inlet flow at the inlet of an engine inlet or intake (1) in engine static tests, consisting of an air-permeable element (4) which, in an end position, is arranged situated near an engine housing (2) and partially enclosing the latter, characterized in that the air-permeable element (4) is formed with a first air-permeable embodied planar element part (6), which is arranged under the engine housing (2), which is positioned along a horizontal engine housing axis (8) and parallel to a planar ground (7) in the vertical spacing distance (a), on the surfacial rim side on the longitudinal edges of which, the longitudinal edges being situated along the engine housing axis (8), there are arranged, laterally downstream of the longitudinal edges, further air-permeable embodied planar element parts (9 to 12), that are embodied tiltable or foldable out of an existing horizontal orientation to the engine housing (2).

2. Apparatus according to claim 1, characterized in that a second element part (9) and a third element part (10) are rotatably movably supported and mechanically secured on the longitudinal edge side to the first element part (6) on a first longitudinal edge and on a second longitudinal edge respectively.

3. Apparatus according to claim 2, characterized in that a fourth element part (11) is arranged situated next to the second element part (9) on a third longitudinal edge of the latter, and a fifth element part (12) is arranged situated next to the third element part (10) on a fourth longitudinal edge of the latter, which are rotatably movably supported and mechanically secured on the longitudinal edge side.

4. Apparatus according to claim 1, characterized in that the air-permeable element (4), which is integrated of the first element part (6) and the further element parts (9 to 12), is initially set onto a planar configured ground (7) (in horizontal orientation), to which a lifting and folding unit is positioned below the ground overlay, which is installed ground-sunken, with the lifting mechanism of which the horizontally situated element parts (4, 9 to 12) can be vertically lifted to an intermediate position (4a) located at a vertical spacing distance (a), which position is located below the engine housing (2) and situated near the latter, of which the ground-contacting horizontal orientation is maintained unchanged.

5. Apparatus according to claim 4, characterized in that a ground region is cut or recessed out of the ground (7), to which a ground boundary (5) is bordered or framed in on the ground rim side of the recess, which ground boundary is fitted or adapted to the integrated (from several element parts 6, 9 to 12) form of the air-permeable element (4), within which the air-permeable element (4) is arranged in a planar manner, of which the non-ground-contacting surface region is arranged flush with a ground-opposite side region (14) of the ground boundary (5) or approximately flush at least with the ground-surface of the ground (7).

6. Apparatus according to claim 1, characterized in that the first element part (6) is embodied parallelepiped or cube shaped, of which the base and top surface is configured square or rectangular shaped.

7. Apparatus according to claim 1, characterized in that the further element parts (9 to 12) are embodied variously, preferably parallelepiped or cube shaped, or uniformly only square or cube shaped, of which the base or top surface is configured square or rectangular shaped.

8. Apparatus according to claim 7, characterized in that the first element part (6) and the further element parts (9 to 12) are embodied uniformly long along the engine housing axis (8).

9. Apparatus according to claim 4, characterized in that a folding mechanism is integrated in the lifting and folding unit, with which folding mechanism the further element parts (9 to 12), which are embodied to be foldable facing toward the first element part (6), can be moved out of the intermediate position (4a) thereof into an end setting, which is corresponding to various different end positions of the air-permeable element (4), preferably an end position of the air-permeable element (4) located near the engine housing (2).

10. Apparatus according to claim 9, characterized in that the end setting of the individual further element parts (9 to 12) is different, to the extent that a) the second and the third element part (9, 10) is angled onto the first element part (6) on the edge rim side and the second and the fourth element part (9, 11) as well as the third and the fifth element part (10, 12) are arranged lying next to one another and not angled relative to one another as well as aligned flush in a straight line, whereby these flush aligned element parts (9 to 12) can be moved out of the intermediate position (4*a*) into a second end setting (4*b*) with the folding mechanism of the lifting and folding unit, or b) the second and the third element part (9, 10) is angled onto the first element part (6) on the edge rim side and the fourth element part (11) is angled away from the second element part (9) as well as the fifth element part (12) angled away from the third element part (10), to such an extent that the fourth and the fifth element part (11, 12) is arranged perpendicularly to the first element part (6), whereby the third and fourth element part (10, 11) can be moved out of a position corresponding to the second end setting (4*a*) into a third end setting (4*c*) with the folding mechanism of the lifting and folding unit, c) none of the element parts (9 to 12) is angled onto the first element part (6) so that the intermediate position (4*a*) corresponding to the horizontal arrangement of all element parts (6, 9 to 12) coincides with a first end setting.

11. Apparatus according to claim 10, characterized in that the length of the fourth and of the fifth perpendicularly arranged element part (11, 12) is embodied with different length as considered relative to one another.

12. Apparatus according to claim 9, characterized in that, a vertical lifting of all element parts (6, 9 to 12) of the air-permeable element (4) is realized with the lifting mechanism, and additionally the folding of the further element parts (9 to 12) is realized with the folding mechanism during the lifting process.

13. Apparatus according to claim 5, characterized in that a taxiway covering (13) is applied onto the surface of the ground (7), from which taxiway covering a covering region that is arranged congruent to the recessed ground region is cut out or recessed, which is adapted or fitted to the integrated (of several element parts 6, 9 to 12) form of the air-permeable element (4), which is arranged with the non-ground-contacting surface substantially flushly with the surface of the taxiway covering (13).

14. Apparatus according to claim 13, characterized in that the first element part (6) and the further element parts (9 to 12) of the air-permeable element (4) that is ground-contacting or arranged within the ground boundary (5) is embodied in such a manner that it is able to be rolled over and capable of being rolled over by a land vehicle or a ground-contacting air vehicle, without being damaged.

15. Apparatus according to claim 14, characterized in that the material of the element parts (6, 9 to 12) is embodied pressure and weather resistant as well as substantially light in weight.

16. Apparatus according to claim 15, characterized in that the material is metallic or synthetic plastic-like or a material consisting of both components.

17. Apparatus according to claim 16, characterized in that the material is a synthetic plastic that is filled with metal particles or other substances suitable for the purpose, which are useful to the material strength.

18. Apparatus according to claim 16, characterized in that the element parts (6, 9 to 12) are constructed of a metal core, a synthetic plastic surrounding the latter, which is synthetic plastic coats at least the metal core.

* * * * *